United States Patent Office 2,914,489
Patented Nov. 24, 1959

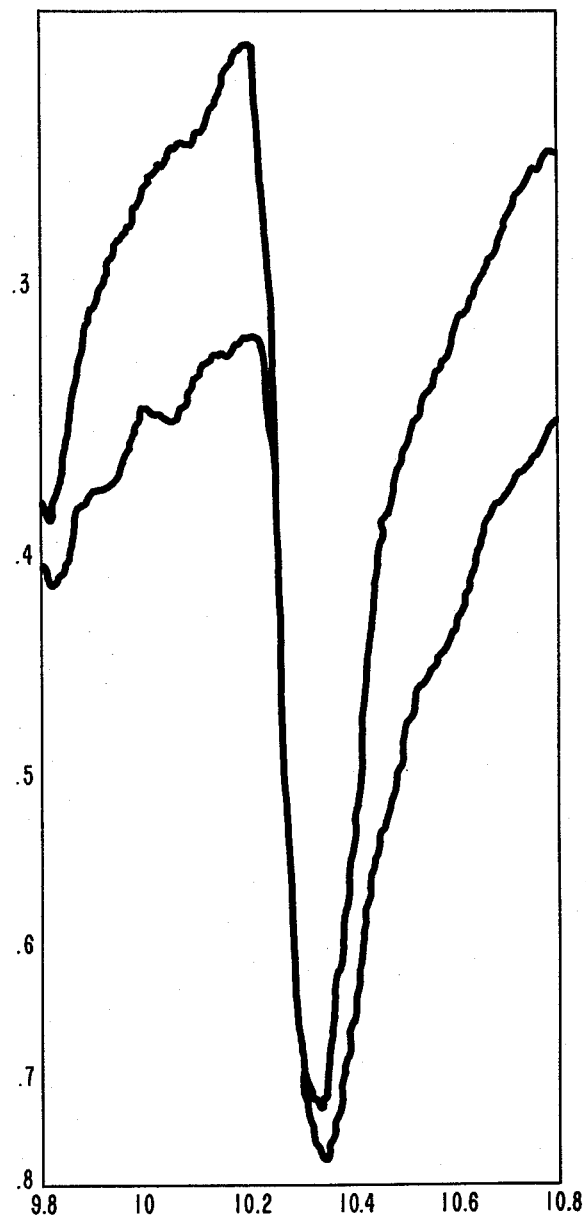

2,914,489

PRODUCTION OF POLY P-XYLENE POLYMERS CONTAINING HALOGEN

Luther A. R. Hall, Wilmington, Del., assignor to E. I. du Pont de Nemours and Company, Wilmington, Del., a corporation of Delaware Application January 10, 1956, Serial No. 558,282

12 Claims. (Cl. 260—2)

This invention relates to a novel and useful chemical compound and to a process for its preparation. More specifically it relates to a poly-p-xylene and to a polyetharyl having units of the structure $$-Ar-Z-$$

wherein —Ar— is a divalent aromatic radical, i.e., it contains resonant unsaturation, and —Z— is at least one radical from the class consisting of $$-CH=CH-Ar-Q-$$

$$\begin{matrix} & & X \\ & & | \\ & & -C=CH-Ar-Q- \end{matrix}$$

$$\begin{matrix} Y & Y \\ | & | \\ -CH-CH-Ar-Q- \end{matrix}$$

and $$\begin{matrix} -CH=C-Ar-Q- \\ | \\ X \end{matrix}$$

wherein —Q— is a radical of the class $$\begin{matrix} X & & X \\ | & & | \\ -CH_2-CH- & & -CH=C- \end{matrix}$$

and $$\begin{matrix} X & & X \\ | & & | \\ -CH-CH_2- & & -C=CH- \end{matrix}$$

$$\begin{matrix} X & X \\ | & | \\ -CH-CH- \end{matrix}$$

X being halogen and Y being a member of the class consisting of X and hydrogen. The carbon atoms of the divalent aromatic ring may have attached to them hydrogen, halogen, nitrile, alkyl, aryl, aralkyl, alkaryl, halogenoaryl, and/or halogenoaralkyl atoms or groups, or the like.

It is an object of this invention to provide a process for the preparation of a polymer as defined above.

Another object is to provide novel compositions comprising polyphenethylhalide and its nuclear-substituted derivatives and polyetharyls which have carbon-carbon unsaturation between the rings and their nuclear-substituted derivatives and their derivatives with halogen atoms substituted on the linking ethylenic carbon atoms.

A further object is to provide processes for the preparation of the polyphenethyl halides and the polyetharyls and their substituted derivatives.

These and other objects will become apparent in the course of the following specification and claims.

In accordance with this invention it has been found that a novel polymer having recurring units of the types described above can be prepared by pyrolyzing vapors, and thereafter cooling the said vapors, of monomers having the formula $$XCH_2-Ar-CH_2Y$$

wherein —Ar— is a divalent aromatic radical, X is halogen and Y is a member of the class consisting of hydrogen and halogen, with the proviso that where —X is chlorine, —Y is halogen, the free valences of the —$CH_2X$ and —$CH_2Y$ groups being attached to carbon atoms which are separated by one or more conjugated double bonds of the said divalent aromatic radical, these carbon atoms being adjacent or separated by an even number of carbon atoms.

The monomers are polymerized by a process in which they are vaporized, pyrolyzed, and then cooled. Polymer formation occurs on the wall of the cooling chamber. Pyrolysis is usually performed in a tube, which is preferably packed with inert particles to improve heat transfer. At times it has been found advisable to dilute the monomer vapor with an innocuous gas, such as nitrogen.

The drawing shows sections of two infra-red characteristic curves taken from a recording spectophotometer chart wherein absorbance (optical density) is plotted as ordinate versus wavelength in microns as abscissa showing a sharp increase in absorption at the band 10.3 to 10.4 microns, indicating high ethylenic unsaturation in the polymer produced from p-methylbenzyl bromide (upper curve) and p-xylylene dibromide (lower curve).

The following examples are cited to illustrate the invention. They are not intended to limit it in any manner.

Example I p-Methylbenzyl bromide and p-xylylene dibromide are prepared by the slow addition of 678 grams of bromine to 405 grams of p-xylene at reflux temperature over a 2.5 hour period. The reaction mass is distilled to give 424 grams of a mixture of the mono- and di-bromo derivatives. The p-methylbenzyl bromide is extracted from the mixture with petroleum ether. A colorless solid (369 grams) with a melting point of 33° C. is obtained.

p-Methylbenzyl bromide is vaporized under reduced pressure at a temperature of 127° C. It is passed through a 15 inch quartz pyrolysis tube packed with small pieces of quartz tubing at a temperature of 765° C. under a pressure of 1.5 mm. Monomer feed is controlled so that about 31 grams of monomer are consumed per hour. The pyrolyzed gases then pass into a receiver maintained at about room temperature, where polymer is deposited on the walls. Uncondensed monomer is recovered in a low temperature trap. The unreacted gases are then led into a hydrogen chloride trap containing a 50% solution of potassium hydroxide in water. Bromine may also be recovered. The polymer, which is obtained at conversions of 7.9% per pass, is obtained as a thin, yellow, tough, transparent film, which is easily stripped from the receiver. Polymer can be obtained when pyrolysis temperatures as low as 570° C. are used. Ethylenic unsaturation in this product is indicated by the absorption at the 10.3–10.4 micron band on infra-red spectrophotometric analysis, as shown in the figure (upper curve).

Example II

Another sample of p-methylbenzyl bromide is pyrolyzed under conditions described in the preceding example. Pyrolysis is carried out in the same tube at a pressure of 1.2 mm. and a temperature of 760° C. Monomer is fed in at a rate of 33 grams per hour and is converted to polymer at a rate of 7.9% per pass. After cooling the pyrolyzed vapors, the polymer collected contains about 3.2% bromine. This corresponds to about one bromine atom for each 20 monomer units. Even at this low level of bromine content, the product is flameproof (i.e., burning stops as soon as a free flame is removed). Thus halogen atoms substituted on the aliphatic carbon atoms separating the benzene rings appear more effective in imparting flameproofness than halogen atoms substituted on the aromatic ring.

When p-methylbenzyl chloride is substituted for p-methylbenzyl bromide in the above process, the product is poly-p-xylene.

Polymerization also occurs when the p-xylylene dihalides are subjected to the process described. In these products, the alkyl linking radicals are halogen-substituted, whether the halogen in the monomer is chlorine or bromine. Example III demonstrates the preparation of a brominated polymer.

*Example III* p-Xylylene dibromide, prepared as described in Example I, is recrystallized from benzene. It is a white crystalline material having a melting point of 143–145° C. It is vaporized under reduced pressure at a temperature of 175° C. and passed through the pyrolysis tube at a rate of about 49 grams per hour. The pyrolysis is carried out at a temperature of 650° C. under an average pressure of 1.8 mm. A bromine-containing, dark yellow-green polymer is obtained at a conversion of 22%. Infra-red spectrophotometric analysis of this product shows a sharp break at the 10.3–10.4 micron band (lower curve of the figure) indicating ethylenic unsaturation.

*Example IV*

Another portion of the p-xylylene dibromide is vaporized under reduced pressure and passed through the pyrolysis tube at a rate of about 69 grams per hour. The vapor is pyrolyzed at a temperature of 760° C. under a pressure of 3.0 mm. The polymer, which is formed at a conversion of about 17%, is found to contain about 5.6% bromine. This represents approximately one bromine atom for each 13 monomer units in the polymer. This polymer is flameproof.

*Example V*

Employing the polymerization technique of Example I, p-xylylene dichloride is vaporized under reduced pressure at a temperature of 140° C. and is fed into the pyrolysis zone at a rate of approximately 50 grams per hour. The monomer vapor is pyrolyzed at 760° C. under a pressure of 2.5 mm. The polymer is collected in the manner indicated in Example I and is obtained in a yield of 61.5% at 50% conversion. Polymer can be obtained at temperatures as low as 650° C., but the practical operating limit is considered to be between about 690° C. and 760° C. The product contains 19.2% chlorine, which represents about two chlorine atoms for every three monomer units in the polymer. This polymer is flameproof. It contains ethylenic unsaturation but to a lesser extent than the polymers produced from bromosubstituted monomers.

*Example VI*

A polymer produced as taught in Example V is ground in an equal weight of chlorinated biphenyl containing approximately 54% chlorine ("Aroclor 1254," sold by Monsanto Chemicals Co. of St. Louis, Mo.). The resulting mixture, still containing small discrete particles of polymer, is hot pressed at 5000 pounds per square inch and 350° C. to give a yellow, opaque, tough coherent film. This film is flameproof.

As pointed out previously, the product may be formed from any monomer having the formula $$XCH_2-Ar-CH_2Y$$

wherein —Ar— is a divalent aromatic radical —X is halogen and —Y is a member of the class consisting of hydrogen and halogen with the proviso that where —X is chlorine, —Y is halogen. The term —Ar— is intended to include divalent radicals derived from both simple and condensed ring systems, such as phenylene, biphenylene, anthracene, phenanthrene, and higher homologs, and the like. Typical suitable naphthalene structures include:

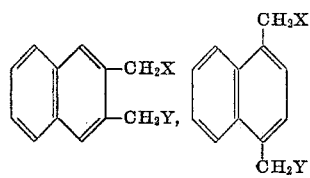

and

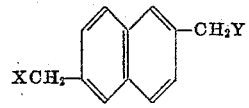

wherein —X and —Y are as defined above. The monomers which contain either chlorine or bromine are preferred. Copolymers may be prepared from a mixture of monomer units which bear different nuclear substituents. Also, a variety of copolymers can be prepared by employing mixtures of different mono- and/or dihalogenated monomers. A dihalogenated monomer containing different halogen substituents produces a halogenated polymer containing both of the halogens. Furthermore, a copolymer having a relatively low proportion of halogenated linking ethylene groups can be prepared by employing a mixture of monohalide and dihalide monomers. Similarly, products containing relatively low amounts of halogen are obtained by using the mono- or di-bromo derivatives alone or combined. Suitable monomers for either polymerization or copolymerization are the alpha-halide derivatives as well as the alpha, alpha'-dihalide derivatives of p-xylene, o-xylene, pseudocumene, durene, chloro-p-xylene, and the like. Other suitable monomers which may be employed in mixtures with the mono-bromo and dihalide monomers to produce copolymers in accordance with the present invention include p-xylene, p-methylbenzyl chloride, chloro-p-xylene, durene, pseudocumene, phenyl-p-xylene and the like.

The temperature of vaporization will vary with the monomer employed. The method of vaporization is not critical. It is sometimes convenient to drop the monomer directly into the pyrolysis tube. In this procedure, the liquid is vaporized on contact with the pyrolysis zone. Monomer vapor may also be formed by distilling the liquid from a still-pot connected to the gas inlet of the pyrolysis tube. Another variation entails the entraining of monomer vapors in a stream of nitrogen, steam or other gas introduced through a capillary at temperatures near the monomer boiling point. As previously pointed out, the use of such diluent gases is sometimes advantageous, particularly in control of reaction conditions.

The optimum rate of feed of monomer vapor into the pyrolysis zone will vary with the monomer, the pressure in the system, the temperature in the pyrolysis zone, and the particular equipment being used. When p-methylbenzyl bromide vapors are exposed for an average of about 0.1 second to a temperature within the range from about 570° C. to about 765° C., a feed rate of about 25 grams per hour to about 40 grams per hour is satisfactory. Under these conditions, a feed rate of about 25 grams per hour is preferred. When p-xylylene dichloride is exposed for about 0.1 second to a pyrolysis temperature within the range of about 690° C. to 760° C., the feed should be adjusted to deliver monomer at a rate of about 37 grams per hour to about 50 grams per hour.

The optimum temperature and contact time within the pyrolysis zone will depend upon the particular monomer or mixture of monomers being used. In general, for many of the halogen-containing monomers, the temperature should be at least about 700° C. to obtain any practical effect when the exposure time within the tube is about 0.1 second. Higher temperatures, generally below about 1000° C., may be employed without deleterious effects. The following temperature ranges are considered optimum for pyrolysis of the various monomers listed at contact times of approximately 0.1 second:

| Monomer: | Temperature, ° C. |
|---|---|
| p-Methylbenzyl bromide | 570–765 |
| p-Xylylene dibromide | 650–760 |
| p-Xylylene dichloride | 690–760 |

The pressure at which pyrolysis is carried out may vary widely. Low pressures are generally used. The equipment employed in the pyrolysis is preferably of such design as to promote heat transfer. A baffle tube or one packed with inert particles has been found satisfactory. However, any zone heated to the proper temperature will be effective to some extent. During the pyrolysis an exposure over a period of at least about 0.01 second at the minimum pyrolysis temperature is considered necessary to activate the monomer for polymerization. Longer periods may be employed if desired.

Polymerization occurs upon passage of the pyrolyzed vapors over a cooled surface. The nature of the surface is not critical. Collection of polymer at room-temperature is preferred. Where the temperature of the collecting medium is maintained at dry ice-acetone temperature (about −70° C.), the polymer forms as a light, fluffy material. Monomer which is unreacted may be collected and recycled.

The polymers obtained by pyrolyzing the vaporized dihalogenated monomers were found to contain less halogen, considerably less in the case of the dibromo monomers, than would be predicted. However, the bromine content is appreciably higher than the amount that can be attributed to terminal bromine atoms. This indicates the presence of unsaturation in the radicals between the rings in the polymer. The presence of this unsaturation has been confirmed by an analysis of the infrared spectra of the flameproof polymers.

Many colored and fluorescent products are observed when the polymers are unsaturated in the ethylene groups linking the aromatic rings. The nature and intensity of the color and fluorescence are dependent upon the extent of the unsaturation and the nature of the substitutents on the aromatic ring.

The polyhydrocarbons prepared by the process by this invention have a number of uses. Films and filaments can be prepared from the plasticized polymers. The films may be used to prepare coated wires which are particularly useful for high temperature applications.

The halogenated polymers are particularly useful in the production of flameproof coatings. They are also useful as organic pigments, fluorescent materials and flameproofing additives.

Many obvious equivalents will be apparent to those skilled in the art from a reading of the above without a departure from the inventive concept. This is a continuation in part of United States application 360,381, filed June 8, 1953, now abandoned.

What is claimed is:

1. A process of forming a polymer which comprises cooling the pyrolyzed vapors of a compound of the formula:

$$X-CH_2-Ar-CH_2-Y$$

wherein —Ar— is a divalent aromatic radical, —X is halogen and —Y is a member of the class consisting of hydrogen and halogen with the proviso that where —X is chlorine, —Y is halogen.

2. The process of claim 1 wherein the compound vaporized is p-methylbenzyl bromide.

3. The process of claim 2 wherein the vapors are pyrolyzed at a temperature between about 570° C. and 765° C.

4. The process of claim 1 wherein the compound vaporized is p-xylylene dichloride.

5. The process of claim 4 wherein the vapors are pyrolyzed at a temperature of between about 690° C. and 760° C.

6. The process of claim 1 wherein the compound vaporized is p-xylylene dibromide.

7. The process of claim 6 wherein the vapors are pyrolyzed at a temperature of between about 650° C. and 760° C.

8. The product formed by the process of claim 1.

9. The polymer of claim 8 wherein —Ar—is phenylene.

10. The polymer of claim 8 wherein X and Y are bromine.

11. The polymer of claim 8 wherein X and Y are chlorine.

12. The polymer of claim 8 where X is bromine and Y is hydrogen.

References Cited in the file of this patent

FOREIGN PATENTS

| 301,664 | Germany | Feb. 8, 1921 |
| 517,738 | Great Britain | Feb. 7, 1940 |
| 673,651 | Great Britain | June 11, 1952 |

OTHER REFERENCES

Szwarc: J. Polymer, Sci., vol. VI, 319–329 (1951). (Copy in Division 60.)